United States Patent
Moskowitz et al.

(10) Patent No.: US 7,853,009 B2
(45) Date of Patent: Dec. 14, 2010

(54) ELECTRONIC DEVICE HAVING A SINGLE-SPLIT HINGE

(75) Inventors: Doug Moskowitz, Weston, FL (US); Martin E. Holman, IV, Boca Raton, FL (US); Bruce A. Ivanik, Pompano Beach, FL (US); Leighton A. Schonlau, Sunrise, FL (US)

(73) Assignee: Motorola, Inc., Schaumburg, IL (US)

( * ) Notice: Subject to any disclaimer, the term of this patent is extended or adjusted under 35 U.S.C. 154(b) by 873 days.

(21) Appl. No.: 11/428,116

(22) Filed: Jun. 30, 2006

(65) Prior Publication Data

US 2008/0000049 A1    Jan. 3, 2008

(51) Int. Cl.
*H04M 1/00* (2006.01)
*H04M 9/00* (2006.01)

(52) U.S. Cl. .................... 379/433.12; 16/330

(58) Field of Classification Search ............ 16/330, 16/303, 340; 455/90.3, 550.1, 575.1, 575.3; 379/433.1, 433.11, 433.13, 434
See application file for complete search history.

(56) References Cited

U.S. PATENT DOCUMENTS

| | | | |
|---|---|---|---|
| 6,317,927 B1 * | 11/2001 | Lai et al. ................ | 16/342 |
| 6,879,337 B2 * | 4/2005 | Tatehana et al. ......... | 348/14.02 |
| 7,034,755 B2 * | 4/2006 | Takagi ................... | 343/702 |
| 7,203,532 B2 | 4/2007 | Pan | |
| 7,248,903 B2 | 7/2007 | Yoda | |
| 7,272,423 B2 * | 9/2007 | Satoh et al. ............. | 455/575.3 |
| 7,809,412 B2 | 1/2008 | Carlson | |
| 7,392,072 B2 * | 6/2008 | Im ........................ | 455/575.3 |
| 7,401,383 B2 * | 7/2008 | Pan ....................... | 16/367 |
| 2004/0259608 A1 | 12/2004 | Huang et al. | |
| 2005/0261041 A1 * | 11/2005 | Im ........................ | 455/575.3 |
| 2006/0185126 A1 * | 8/2006 | Su ........................ | 16/340 |
| 2006/0246964 A1 * | 11/2006 | Castaneda et al. ....... | 455/575.3 |
| 2007/0032275 A1 | 2/2007 | Suzuki et al. | |
| 2007/0072658 A1 | 3/2007 | Cheng | |

OTHER PUBLICATIONS

Dictionary (def: "Bridge") The American Heritage® Dictionary of the English Language, Fourth Edition Copyright © 2007, 2000 by Houghton Mifflin Company. Updated in 2009. Published by Houghton Mifflin Company. All rights reserved.*
Samsung, "Samsung SGH-Z105 User Guide", *Unknown publication date*.

* cited by examiner

*Primary Examiner*—Fan Tsang
*Assistant Examiner*—Phylesha Dabney
(74) *Attorney, Agent, or Firm*—Hisashi D. Watanabe; Philip H. Burrus, IV

(57) ABSTRACT

A hinge assembly (200) for a clamshell-type electronic device includes a spindle (201) and casing sleeve (202). The hinge assembly (200) facilitates a single-split hinge. In addition to providing the mechanical hinging action, the hinge assembly (200) provides a reliable electrical connection between a first portion (502) and a second portion (601) of the clamshell device. The spindle (201) includes a nock (203) through which a linking member (304) of a flexible substrate (301) passes. The nock (203), having a semi-circumferential stop (206) bridging a first nock wall (204) and second nock wall (205), facilitates the electrical connection between an electrical circuit disposed in the first portion (502) of the electronic device and an electrical circuit disposed within the second portion (601) of the electronic device. In one embodiment, a hinge assembly (700) facilitates other components, such as an image capture device (720) being disposed within the hinge region of an electronic device.

22 Claims, 7 Drawing Sheets

ELECTRONIC DEVICE HAVING A SINGLE-SPLIT HINGE

BACKGROUND

1. Technical Field

This invention relates generally to hinged electronic devices, and more particularly to a hinged electronic device having a single-split hinge with an electrical conductor passing through the single-split hinge.

2. Background Art

Mobile telephones have become incredibly popular. According to the Cellular Telecommunications Industry Association (CTIA), at the end of 2005, over 200 million people in the United States alone use mobile telephones. These two way communication devices allow people to stay in touch with friends, family, and co-workers wherever they go.

Mobile telephones are generally available in one of two mechanical configurations or "form factors": clamshell or candy bar. Clamshell, or "flip", phones are hinged devices that open and close like a clam. Clam shell phones often have the keypad on one side of the hinge, while the display is located on the other. Candy bar phones are generally one solid piece, with keypad and display on a unitary face.

Many people prefer clamshell phones due to the fact that they often carry the phone in a pocket or purse. A first reason that clamshells are preferred is that when the clamshell is closed, the keypad is covered and protected. This means that keys, coins, or other pocket objects will not inadvertently press a key causing a call to be transmitted. Second, when the clamshell is closed, the display is protected. Thus, the same keys, coins, and other pocket objects will not scratch the display.

Turning now to FIG. 1, illustrated therein is one embodiment of a prior art clamshell mobile telephone 101. A first half 102 is connected to a second half 103 with a hinge 104. The hinge 104 is a "double-split" hinge in that a pair of hinge ends 105,106 coupled to the second half 103 engage a tab 107 on the first half 102 to form the hinge 104. The hinge 104 is "double-split" because there are two parting lines 108,109 at the hinge. The double-split is used because it offers a way for electrical conductors to pass from the first half 102 to the second half 103 through one split, while a hinge mechanism is disposed beneath the other split.

While the double-split hinge works well in practice, consumers are continually seeking sleeker, more streamlined designs. Designers are continually trying to offer more stylish shapes and contours in electronic devices. A single-split hinge would offer more freedom to designers, thereby allowing them to continue to refine and retool phone aesthetics. However, prior art attempts at single-split hinge design have not provided a reliable mechanism for coupling electronic circuitry in one half with electronic circuitry in the other through the hinge.

There is thus a need for a single-split hinge design for electronic devices that facilitates electrical coupling of components across the single-split hinge.

Figure 1:
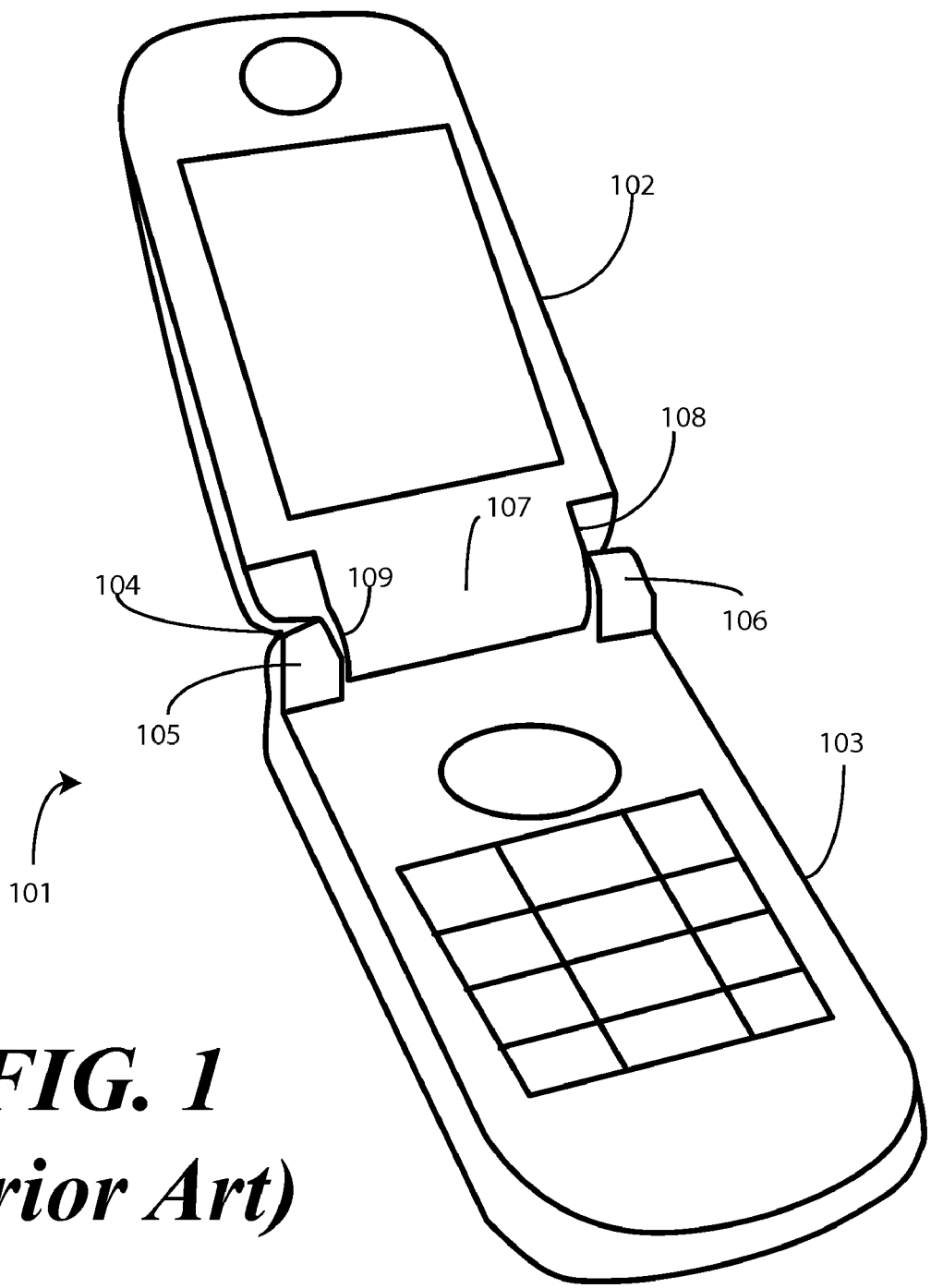
FIG. 1 illustrates a prior art, double-split hinge.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Described herein is a hinge assembly and flexible substrate that enables a clamshell form factor to be constructed having a single-split between the a first half of the device and a second half of the device. The hinge assembly includes a casing sleeve coupled to one half of the device and a spindle coupled to the other half. The spindle includes an integrated cam follower. A cam and spring provide opening and closing torque. A pin secures the spindle to the casing sleeve, and two bearing washers help to minimize wear.

Figure 2:
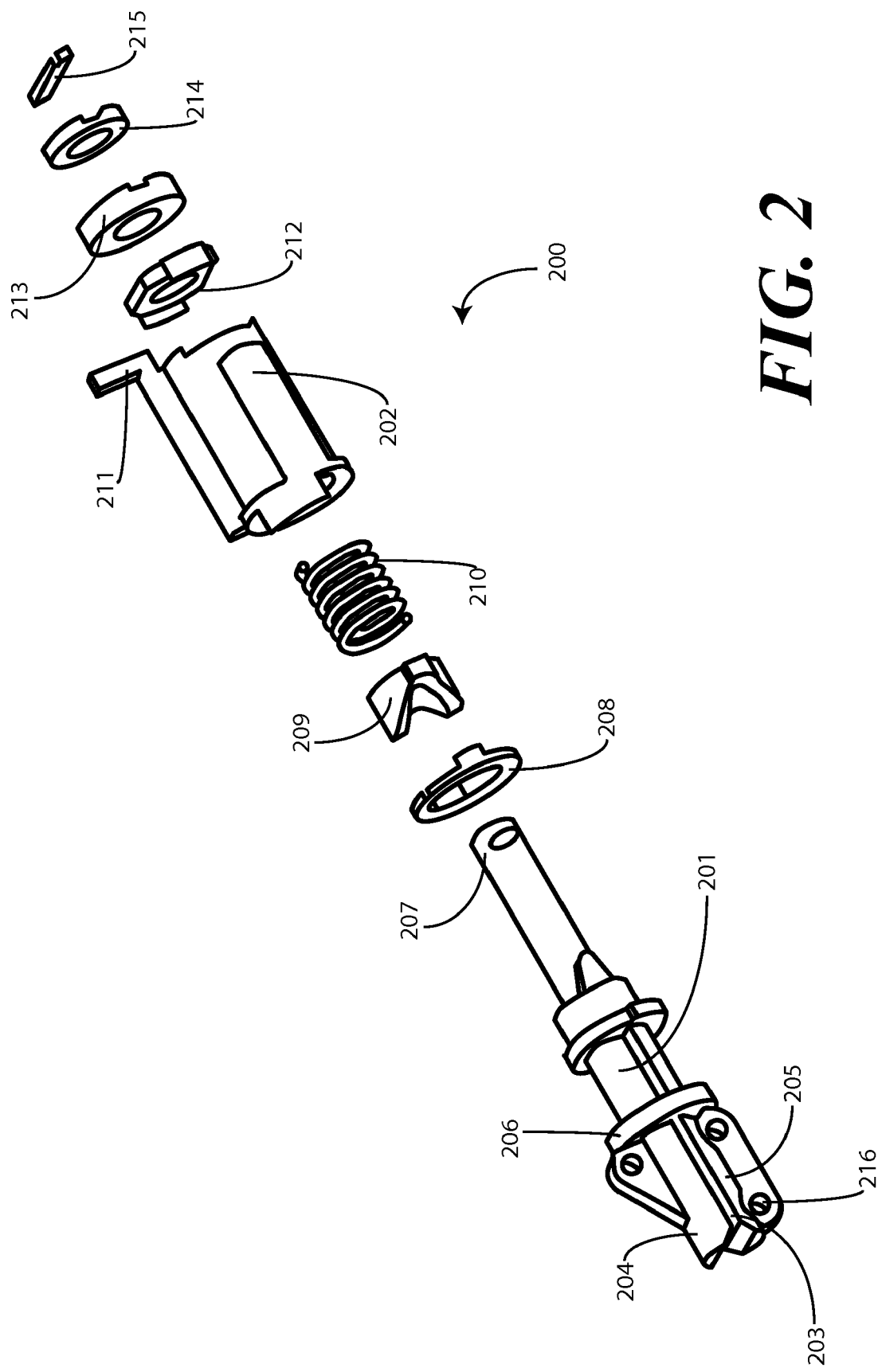
FIG. 2 illustrates one embodiment of a hinge assembly in accordance with the invention.

Turning now to FIG. 2, illustrated therein is an exploded view of a hinge assembly 200 in accordance with one embodiment of the invention. The hinge assembly 200 includes a spindle 201 and a casing sleeve 202. The components, in one embodiment, are manufactured from a rigid, durable metal such as stainless steel by way of metal injection molding, die casting, or other methods. The casing sleeve 202 is mechanically coupled to the spindle 201 at a first end 207 of the spindle 201 by a pin 215.

The spindle 201 includes a nock 203 passing through at least a portion of one end of the spindle 201. The nock 203 defines a first nock wall 204 and a second nock wall 205. A semi-circumferential stop 206 is disposed about the spindle 201 such that the semi-circumferential stop 206 bridges the first nock wall 204 and the second nock wall 205. As will be illustrated in more detail below, the nock 203 and semi-circumferential stop 206 facilitate a flexible substrate passing through the hinge assembly 200.

A spring 210 is disposed between the spindle 201 and the casing sleeve 202. The spring 210 provides a torsion force allowing the hinge assembly 200 to open and close. Said differently, the spring 210 applies a load force between the spindle 201 and the casing sleeve 202. A cam 209 is disposed between the spring 210 and the spindle 201. A front bushing 208 serves as an interface between the spindle 201 and cam 209 to prevent wear.

The hinge assembly 200 couples together when the spindle 201 passes through the casing sleeve 202. A stationary bushing 212, rear rotational bushing 213, and rear load washer 214 pass over the first end 207 of the spindle 201. A pin 215 holds the assembly together.

To couple the hinge assembly 200 to an electronic device, the casing sleeve 202 includes a mechanical coupling member 211. The mechanical coupling member 211 may be a mechanical structure capable of snapping or being adhesively coupled to an electronic device housing. Alternatively, the mechanical coupling member 211 may include apertures for fasteners, including screws, bosses, rivets, or other fastening means. The spindle 201 includes fastening components as well. The fastening components, shown illustratively in FIG. 2 as at least one boss 216, provide a mechanism for the spindle 201 to couple to one housing of an electronic device. A connector may be inserted in the boss 216 to mechanically couple the spindle to the housing.

Figure 3:
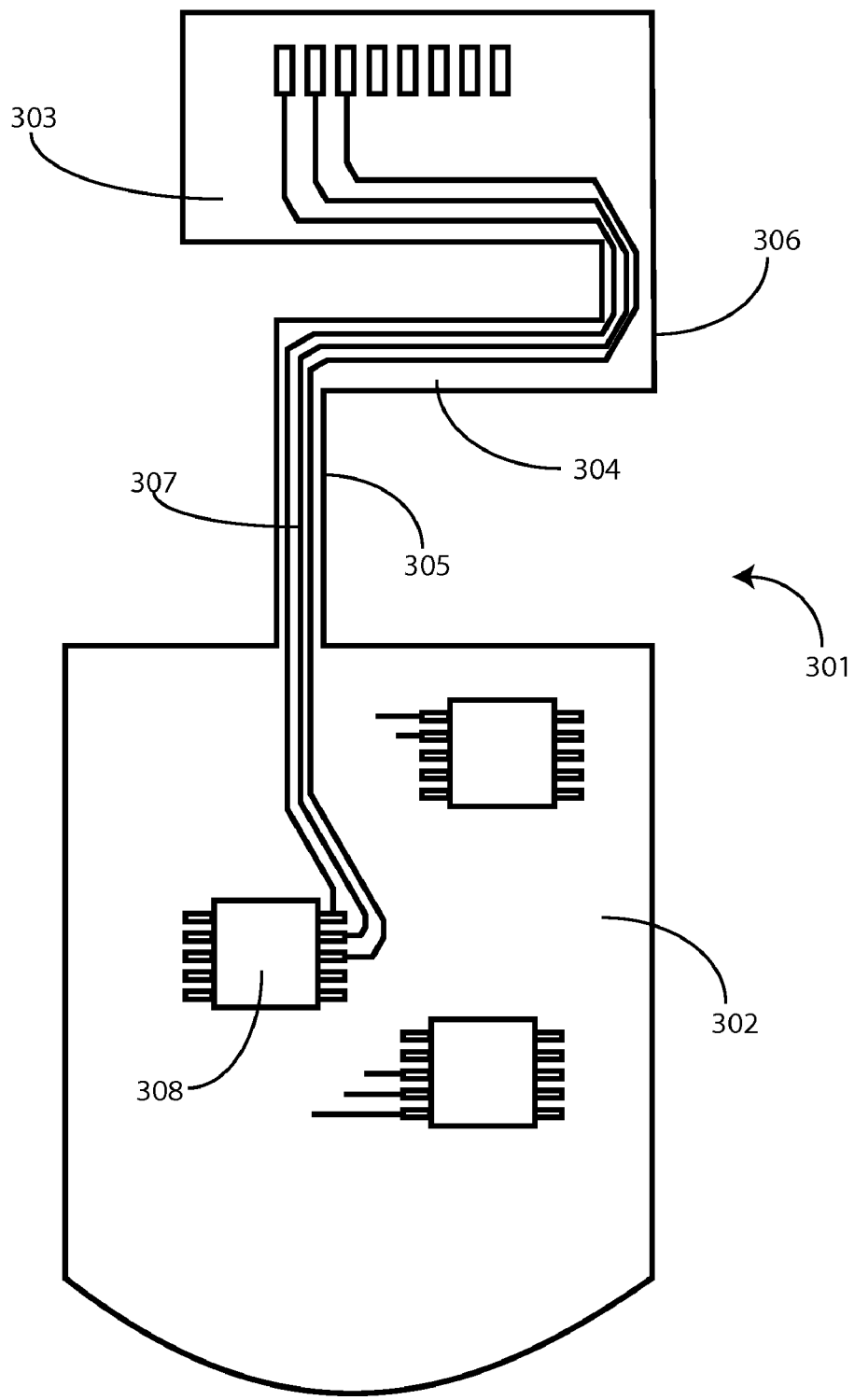
FIG. 3 illustrates one embodiment of a flexible substrate suitable for use with a hinge assembly in accordance with the invention.

Turning now to FIG. 3, illustrated therein is one embodiment of a flexible substrate 301 in accordance with the invention. The hinge assembly (200) of the present invention facilitates a reliable electrical link through the hinge, and one suitable electrical structure for doing so is the flexible substrate. In one embodiment, the flexible substrate 301 comprises flexible copper conductors encapsulated in Kapton®. The flexible substrate 301, in addition to having flexible conductors running within the substrate, may also have conductive pads and traces atop the substrate for coupling to electrical components 308.

The flexible substrate 301 includes a first major face 302 and a second major face 303. The first major face 302 is for coupling to electrical components or circuits within a first half of a clamshell electronic device, while the second major face 303 is for coupling to electrical components and circuits in the second half of a clamshell electronic device. For instance, each of the first major face 302 and second major face 303 may have components coupled directly thereto, as exemplary electrical component 308 is coupled to the first major face 302. Alternatively, the first major face 302 and second major face 303 may couple to other substrates, including rigid substrates in each half of the electronic device.

A linking member 304 couples the first major face 302 to the second major face 303 about the hinge assembly (200). As will be shown in more detail below, the linking member passes through the nock (203) of the spindle (201) to provide a reliable electrical link about the hinge assembly (200). A first connecting member 305, extending distally from the first major face 302, connects the first major face 302 to the linking member 304. A second connecting section 306, extending distally from the second major face 303, connects the second major face 303 to the linking member 304. Thus, the linking member 304 couples the first connecting section 305 with the second connecting section 306, thereby coupling the first major face 302 with the second major face 303.

In one embodiment of the invention, the linking member 304 is disposed substantially orthogonally with the first connecting member 305 and the second connecting member 306. This substantially orthogonal relationship allows the first connecting member 305 to wrap about the spindle (201), thereby providing strain relief, while the linking member 304 passes through the nock (203). The second connecting member 306 then wraps about the spindle (201) to provide an electrical connection through the hinge assembly (200). The term "substantially orthogonal" is used because while the relationship appears to be roughly orthogonal to the naked eye, tolerances and slight design choice nuances may lead to an actual angle that is a few degrees to either side of a perfect orthogonal angle.

To provide the electrical connection, the flexible substrate 301 includes at least one electrical conductor 307 that passes through the linking member 304 and electrically connects the first major face 302 with the second major face 303. Multiple conductors may be also used. Where, for example, a first half of a hinged electronic device includes the central processor, keypad, and power management circuits, and the second half includes a display module and radio-frequency circuitry, the electrical conductor 307 may comprise a plurality of conductors for transferring data signals, power, and other signals between the two halves of the electronic device.

Figure 4:
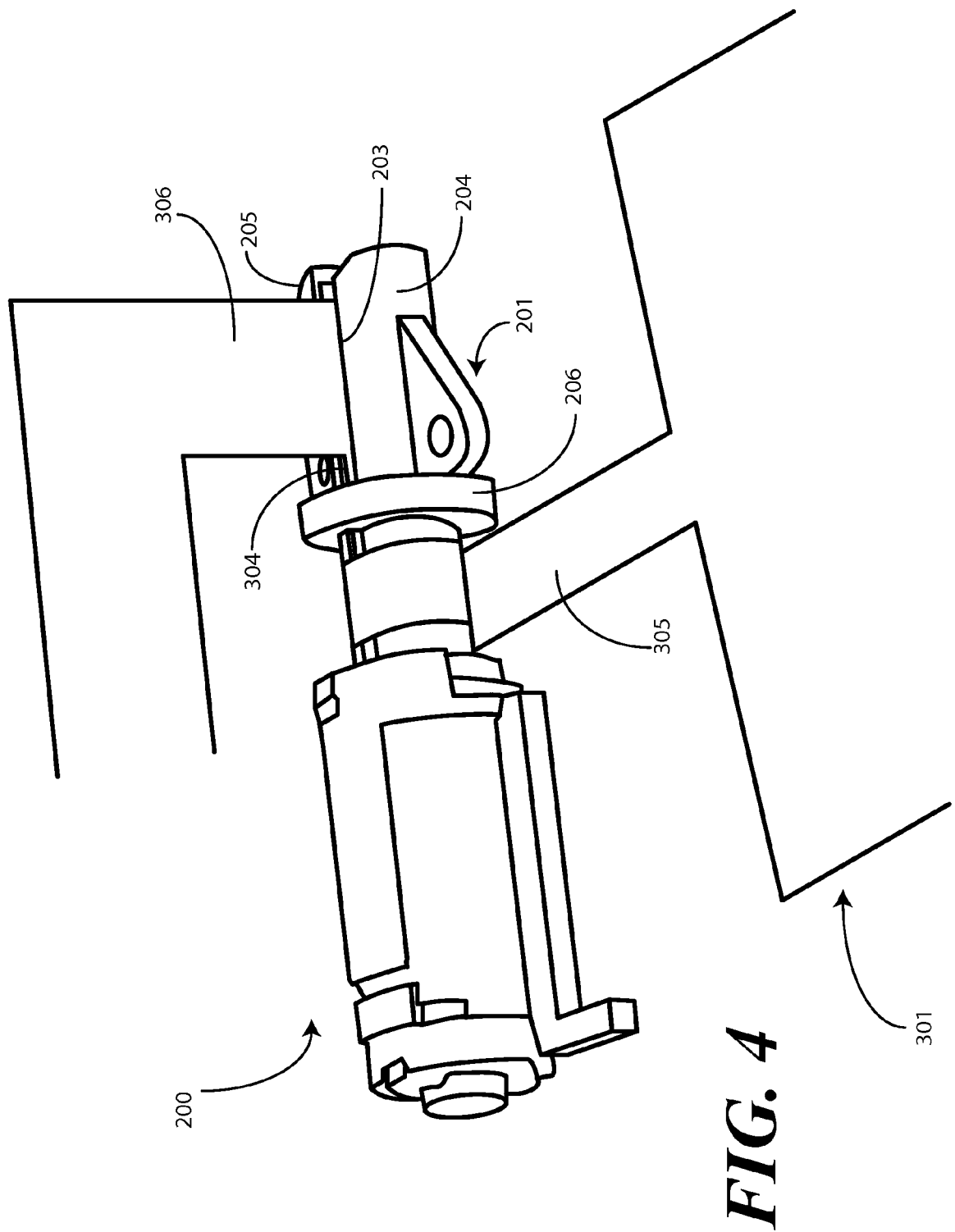
FIG. 4 illustrates one embodiment of a hinge assembly in accordance with the invention having a flexible substrate coupled thereto.

Turning now to FIG. 4, illustrated therein is a hinge assembly 200 with a flexible substrate 301 disposed about the hinge assembly 200 in accordance with one embodiment of the invention. As mentioned above, the first connecting member 305 wraps about the spindle 201, thereby providing some strain relief and coiling functionality for the electrical connection. The linking member 304 is disposed within the nock 203. The second connecting member 306 then extends from the nock 203, thereby completing the electrical connection through the hinge assembly 200.

As shown in FIG. 4, in one embodiment, the first connecting member 305 is disposed on a first side of the semi-circumferential stop 206, while the second connecting member 306 is disposed on a second side of the semi-circumferential stop 206. Thus, the semi-circumferential stop 206 not only provides a mechanical connection between the first nock wall 204 and the second nock wall 205, but it also serves as a separator between the first connecting member 305 and the second connecting member 306.

Figure 5:
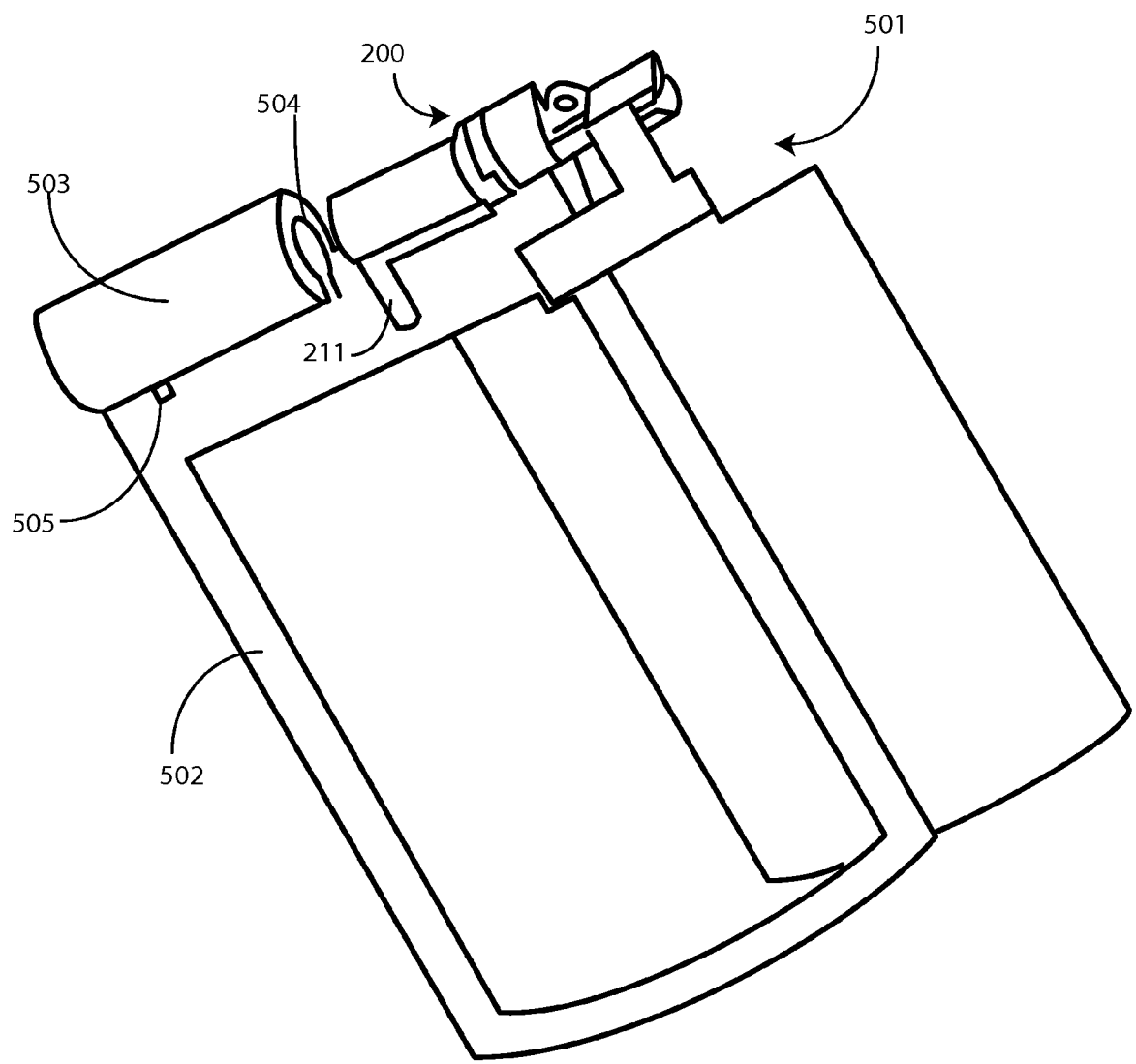
FIG. 5 illustrates one embodiment of a hinge and flexible substrate coupling with a first housing of an electronic device in accordance with the invention.

Turning now to FIG. 5, illustrated therein is a completed flexible substrate and hinge assembly 501 being inserted into a first portion 502 of a clamshell-type electronic device. The first portion 502 includes a first half hinge housing 503 having an aperture 504 into which the hinge assembly 200 may be inserted. In one embodiment of the invention, the first half hinge housing 503 includes an insertion slot 505 into which the mechanical coupling member 211 may be inserted. In this embodiment, when the hinge assembly 200 is inserted into the first half hinge housing 503, the mechanical coupling member 211 is disposed within the insertion slot 505.

Figure 6:
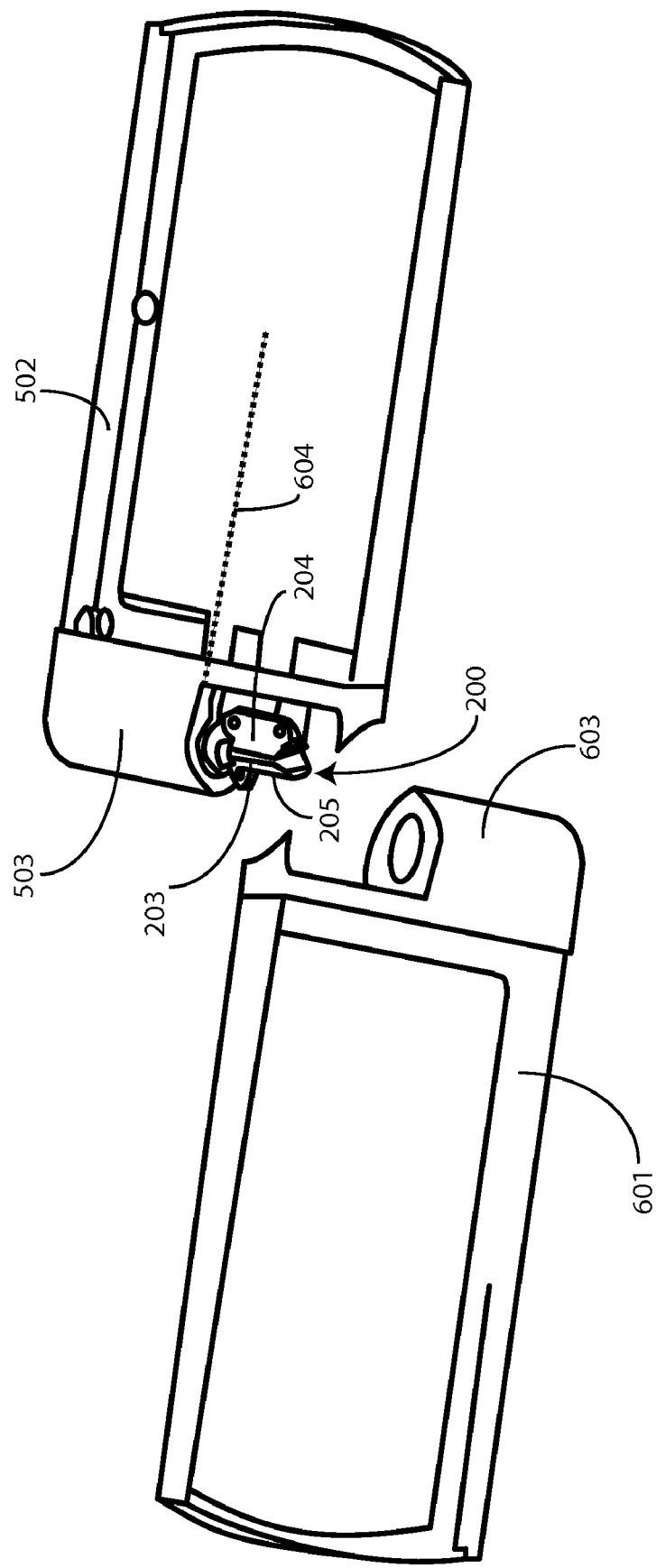
FIG. 6 illustrates an exploded view of an electronic device using a hinge assembly in accordance with one embodiment of the invention.

Turning now to FIG. 6, illustrated therein is an exploded view of an electronic device having a first portion 502, second portion 601, and a hinge assembly 200 in accordance with one embodiment of the invention. As with the first portion 502, the second portion 601 includes a second half hinge housing 603 into which the hinge assembly 200 may be inserted. When assembled, the casing sleeve (202) is mechanically coupled to the first half hinge housing 503, while either or both of the first nock wall 204 and second nock wall 205 is mechanically coupled to the second half hinge housing 603.

When assembled, the first half hinge housing 503 and second half hinge housing 603 meet to form a parting line, illustrated in FIG. 6 as dashed line 604. The nock 203, having the linking member (304) disposed therein, passes across the parting line 604, thereby completing the electrical connection between the first portion 502 and the second portion 601. Thus, where the first portion 502 includes an electrical circuit disposed therein, such as a keypad module in a mobile or radiotelephone, and the second portion 601 includes a second electrical circuit disposed therein, such as a display module in a mobile or radiotelephone, the linking module (304) may serve as an electrical connection between the first electrical circuit and the second electrical circuit.

As alluded to earlier, one advantage of a portable electronic device having a single-split hinge in accordance with the invention is that it offers a sleek and stylish look. Another advantage is that the single-split hinge allows other components to be located within the hinge assembly. With prior art, double-split hinges, this is not possible as one half of the hinge houses a mechanical spring-loaded hinge assembly, and the other houses the electrical connections.

Figure 7:
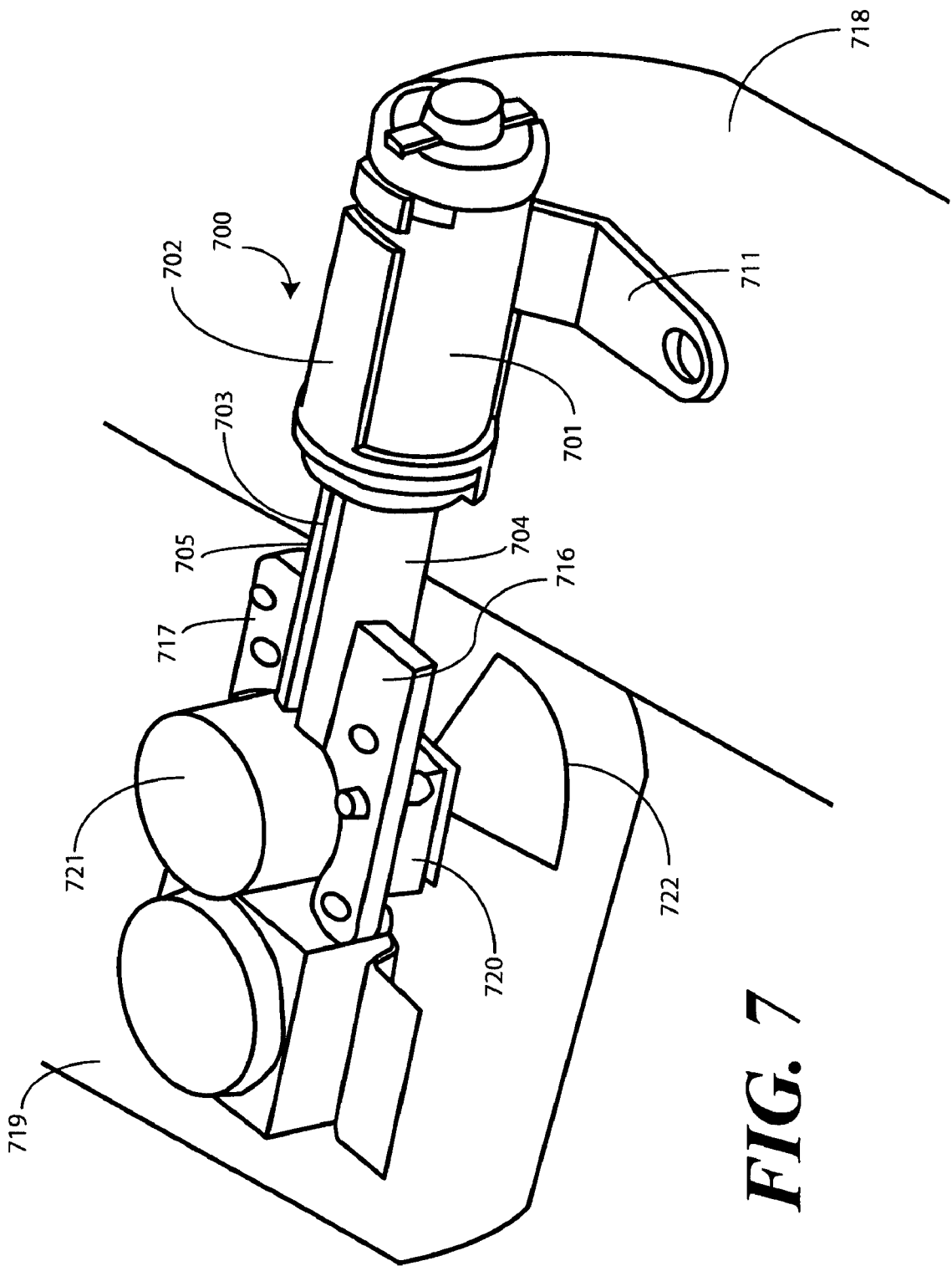
FIG. 7 illustrates one embodiment of a hinge assembly accompanying an image capture device in accordance with the invention.

Turning now to FIG. 7, illustrated therein is one embodiment of a hinge assembly 700 in accordance with the invention that accommodates other components within the hinge region. The hinge assembly 700 includes a spindle 701 and a casing sleeve 702. The spindle 701 comprises a nock 703 that passes through at least a portion of the spindle 701. The nock 703 defines a first nock wall 704 and a second nock wall 705. In one embodiment, the spindle 701 includes a first mechanical stabilizing member 716 coupled to the first nock wall 704 and a second mechanical stabilizing member 717 coupled to the second nock wall 705.

The casing sleeve 702 is mechanically coupled to the spindle 701 at a first end of the spindle 701. In one embodiment, the casing sleeve 702 includes a mechanical coupling member 711 extending distally therefrom.

The hinge assembly 700 is suitable for coupling portions of a portable electronic device having a first half hinge housing 718 and a second half hinge housing 719. In one embodiment, the casing sleeve 702 is coupled to the first half hinge housing 718, while the spindle 701 is coupled to the second half hinge housing 719.

The hinge assembly 700 facilitates other components being disposed within the hinge region of the portable electronic device. For example, in one embodiment, an image capture device 720 may be disposed within the hinge region. In the exemplary embodiment of FIG. 7, the image capture device 720 is disposed adjacent with the spindle 701. Thus, the image capture device 720 is disposed within the second half hinge housing 719, along with the spindle 701.

Where the first mechanical stabilizing member 716 and the second mechanical stabilizing member 717 are employed, these members may be used to couple the spindle 701 with the second half hinge housing 719. As shown in FIG. 7, the first mechanical stabilizing member 716 and second mechanical stabilizing member 717 may couple to the second half hinge housing 719 by coupling to a second half hinge housing post 721. The mechanical coupling member 711 couples the casing sleeve 702 to the first half hinge housing 718.

The image capture device 720, in the exemplary embodiment of FIG. 7, is disposed atop the nock 703 beneath the first mechanical stabilizing member 716 and the second mechanical stabilizing member 717. This allows the image capture device's field of view 722 to pass through an aperture in the second half hinge housing 719.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention.

What is claimed is:

1. A hinge assembly, comprising:
   a. a spindle comprising a nock, the nock passing through at least a portion of the spindle so as to define a first nock wall and a second nock wall;
   b. a casing sleeve mechanically coupled to the spindle at a first end of the spindle;
   c. a semi-circumferential stop disposed about the spindle such that the semi-circumferential stop bridges the first nock wall and the second nock wall;
   d. a cam disposed between the spindle and the casing sleeve; and a spring disposed between the spindle and the casing sleeve, the spring applying a load force between the spindle and the casing sleeve.

2. The hinge assembly of claim 1, wherein the cam is disposed between the spring and the spindle.

3. The hinge assembly of claim 2, wherein the casing sleeve comprises a mechanical coupling member extending distally therefrom.

4. A hinge assembly, comprising:
   a. a hinge, comprising:
      i. a spindle comprising a nock, the nock passing through at least a portion of the spindle so as to define a first nock wall and a second nock wall;
      ii. a casing sleeve mechanically coupled to the spindle at a first end of the spindle;
      iii. a semi-circumferential stop disposed about the spindle such that the semi-circumferential stop bridges the first nock wall and the second nock wall: and
      iv. a cam disposed between the spindle and the casing sleeve; and
   b. a flexible substrate coupled about the spindle, the flexible substrate comprising:
      i. a first major face;
      ii. a second major face; and
      iii. a linking member coupling the first major face and the second major face;
      wherein the linking member is disposed within the nock;
      further wherein the flexible substrate comprises at least one conductor electrically coupling the first major face and the second major face, wherein the at least one conductor passes across the linking member.

5. The hinge assembly of claim 4, wherein the flexible substrate further comprises:
   a. a first connecting section extending distally from the first major face; and
   b. a second connecting section extending distally from the second major face;
   wherein the linking member couples the first connecting section to the second connecting section.

6. The hinge assembly of claim 5, wherein the linking member is substantially orthogonal to both the first connecting section and the second connecting section.

7. The hinge assembly of claim 5, wherein the first connecting section is disposed on a first side of the semi-circumferential stop, further where the second connecting section is disposed on a second side of the semi-circumferential stop.

8. The hinge assembly of claim 4, wherein the flexible substrate comprises electrical circuit components coupled to the at least one conductor.

9. A portable electronic device, comprising:
   a. a first portion having a first half hinge housing;
   b. a second portion having a second half hinge housing;

c. a hinge assembly coupling the first portion and the second portion, the hinge assembly comprising:
  i. a spindle comprising a nock, the nock passing through at least a portion of the spindle so as to define a first nock wall and a second nock wall;
  ii. a casing sleeve mechanically coupled to the spindle at a first end of the spindle; and
  iii. a spring disposed between the spindle and the casing sleeve, the spring applying a load force between the spindle and the casing sleeve;
    wherein one of the first nock wall or the second nock wall is mechanically coupled to the second half hinge housing, further wherein the casing sleeve is mechanically coupled to the first half hinge housing; and
    wherein the first half hinge housing and the second half hinge housing meet to form a single parting line, wherein the nock passes across the parting line.

10. The portable electronic device of claim 9, wherein the spindle further comprises a semi-circumferential stop disposed about the spindle such that the semi-circumferential stop bridges the first nock wall and the second nock wall.

11. The portable electronic device of claim 10, wherein the first portion comprises a first electrical circuit disposed therein, further wherein the second portion has a second electrical circuit disposed therein.

12. The portable electronic device of claim 11, wherein the first electrical circuit and the second electrical circuit are electrically coupled by a flexible substrate.

13. The portable electronic device of claim 12, wherein the flexible substrate passes through the nock.

14. The portable electronic device of claim 9, wherein the portable electronic device comprises a radiotelephone.

15. The portable electronic device of claim 9, wherein the spindle comprises at least one boss through which a connector may be inserted to mechanically couple the spindle to the second half housing.

16. The portable electronic device of claim 9, wherein the casing sleeve comprises a coupler for mechanically coupling the casing sleeve to the first half housing.

17. The portable electronic device of claim 16, wherein the first half hinge housing comprises an insertion slot, further wherein the coupler is disposed within the insertion slot.

18. A hinge assembly, comprising:
  a. a spindle comprising a nock, the nock passing through at least a portion of the spindle so as to define a first nock wall and a second nock wall;
  b. a first mechanical stabilizing member coupled to the first knock wall;
  c. a casing sleeve mechanically coupled to the spindle at a first end of the spindle; and
  d. an image capture device disposed adjacent with the spindle and the first mechanical stabilizing member.

19. The hinge assembly of claim 18, wherein the hinge assembly is disposed within a portable electronic device comprising a first half hinge housing and a second half hinge housing, wherein the casing sleeve is coupled to the first half hinge housing, the image capture device is disposed within the second half hinge housing, and wherein the spindle is coupled to the second half hinge housing.

20. The hinge assembly of claim 19, further comprising a second mechanical stabilizing member coupled to the second nock wall, wherein the spindle is coupled to the second half hinge housing by the first mechanical stabilizing member and the second mechanical stabilizing member.

21. The hinge assembly of claim 20, wherein the image capture device is disposed atop the nock beneath the first mechanical stabilizing member and the second mechanical stabilizing member.

22. The hinge assembly of claim 20, wherein the casing sleeve comprises a mechanical coupling member, wherein the mechanical coupling member is coupled to the second half hinge housing.

* * * * *